March 24, 1925.  
C. R. JOHNSON  
TOOL FOR FARM WAGONS  
Filed May 5, 1924
1,530,946
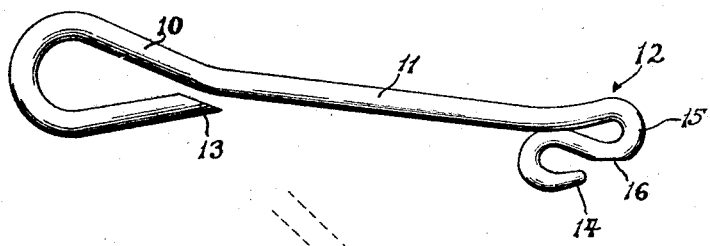
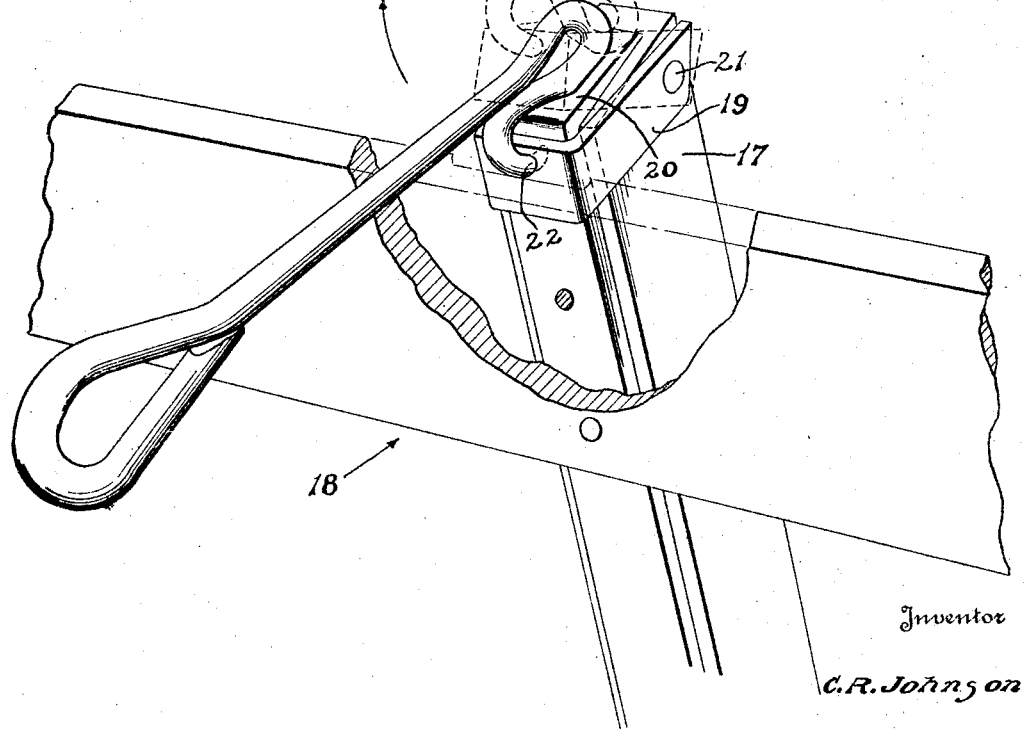

Patented Mar. 24, 1925.

1,530,946

UNITED STATES PATENT OFFICE.

CECIL R. JOHNSON, OF SYLVIA, KANSAS.

TOOL FOR FARM WAGONS.

Application filed May 5, 1924. Serial No. 711,176.

*To all whom it may concern:*

Be it known that I, CECIL R. JOHNSON, a citizen of the United States, residing at Sylvia, in the county of Reno and State of Kansas, have invented certain new and useful Improvements in Tools for Farm Wagons, of which the following is a specification.

My invention relates to a tool primarily intended for lifting clasps holding the sides or gates of hay racks when said sides or gates have to be removed.

The tool may, however, have a wider range of use where a good leverage is needed for lifting or removing tight-gripping objects.

The main object of the invention is to provide a tool for operating clasps on hay rack attachments of the class described in my co-pending application filed simultaneously herewith.

Another object of the invention is to furnish a strong and effective tool which may be manufactured at a very low cost.

One embodiment of the invention is illustrated in the accompanying drawings, in which:

Figure 1 is a side elevation of the tool, and

Figure 2 is a perspective view of the tool in operation.

In the drawings, the reference numeral 10 represents the handle of the tool, the numeral 11 the central portion or body thereof, and 12 the bit or gripping portion.

The handle, body and bit are integrally formed and the tool is preferably forged from a piece of spring steel rod bent at both ends while the body 11 remains straight.

The handle is produced by forming a loop at one end of the rod after cutting the end slantingly as at 13. The loop is not entirely closed but the slanting end 13 is spaced slightly from the body so that the loop may be hooked over a ring or band on the hay rack, thus suspending the tool in a convenient position for ready use.

The other end of the rod is doubled upon itself, in this manner providing an S-shaped bit 12. The bit terminates in a tapered point 14 which is situated some distance to the rear of the curved forward end 15 of the bit. The point 14 is spaced laterally from the rest of the bit to permit the point to obtain a firm grip on an object to be raised.

Between the point 14 and the rounded end 15 of the bit, the under side of the latter has a flat surface 16. This surface permits the seating of the tool when first engaging with the object to be raised and prevents wobbling.

In Figure 2 of the drawings, the use of the tool is illustrated. The reference numeral 17 represents a stake on a hay rack or the like, on which the sides or gates 18 are detachably secured by means of clasps 19 engaging a flat hook 20 on the gate. The clasp is hinged on a bolt 21. The point 14 of the tool is first inserted in the aperture 22 near the upper edge of the clasp 19. The bit 12 is thereupon pushed forward while the flat surface thereof engages the flat top of the hook 20. As soon as the point 14 has obtained a firm hold on the clasp 19, the handle end 10 of the tool is swung upwardly using the rounded end 15 as a fulcrum, turning the clasp 19 around its hinge bolt 21 until the parts take the position indicated by dotted lines in Figure 2. The hook 20 is then free and the gate or side 18 of the hay rack may be removed.

When not in use, the tool may be hung up on its open-ended loop handle in a convenient position on the hay rack.

Having thus described the invention, what I claim is:

1. A tool of the class described made from a single piece of rod and including a handle, a body and a bit, said bit being S-shape in formation with a forwardly directed gripping point to engage in the side of an element which is to be raised and having its upper bend disposed in advance of said point and provided with a flat bottom face between its forward extremity and said point constituting a fulcrum to bear upon an element carrying the element which is to be raised.

2. A tool of the class described consisting of a rod having opposed upper and lower reversed bends at one end constituting a bit, the terminal of said bit forming a gripping point to engage an element which is to be raised and the upper bend of the bit being located in advance of the gripping point to bear upon the part from which said element is to be raised.

In testimony whereof I affix my signature.

CECIL R. JOHNSON. [L. S.]